United States Patent [19]

Greenberg

[11] 3,918,407

[45] Nov. 11, 1975

[54] PET COLLAR

[75] Inventor: Jack Greenberg, Richmond, Va.

[73] Assignee: A. H. Robins Company, Incorporated, Richmond, Va.

[22] Filed: Nov. 20, 1973

[21] Appl. No.: 417,704

[52] U.S. Cl. ................................ 119/156; 119/106
[51] Int. Cl.² ........................................ A01K 27/00
[58] Field of Search ............ 119/156, 106; 424/225

[56] References Cited
UNITED STATES PATENTS

| | | |
|---|---|---|
| 2,971,882 | 2/1961 | Ospenson et al. ................... 424/225 |
| 3,318,769 | 5/1967 | Folckemer et al. .......... 119/156 UX |
| 3,570,077 | 3/1971 | Hawie ................................. 24/164 |

Primary Examiner—Hugh R. Chamblee

[57] ABSTRACT

The use of dimethyl 1,2-dibromo-2,2-dichloroethyl phosphate (naled) in a synthetic resin (PVC) collar for controlling fleas on animals such as dogs and cats. A manufacturing procedure for the collar is described which involves casting a dispersion containing a volatile surface porosity control component to produce a porous surface thereby to enhance the naled release rate to a level adequate for controlling fleas during a period of about 4½ months.

10 Claims, 11 Drawing Figures

PET COLLAR

This invention relates to the control of fleas on warm blooded animals, such as dogs and cats, by application of an insecticidal gas generator device. More particularly, this invention relates to novel compositions and to methods of manufacture of a pet collar comprised of a synthetic resin such as polyvinyl chloride (PVC) having dispersed therein the insecticide dimethyl 1,2-dibromo-2,2-dichloroethyl phosphate, commonly known as naled.

Heretofore, pet collars comprised of a PVC resin having a dispersion of the insecticide dimethyl 2,2-dichlorovinyl phosphate, commonly known as DDVP or by its trademark Vapona, have been widely used for the purpose of controlling fleas on dogs and cats. DDVP has been reported to have an objectionable depressing effect on the plasma and red cell cholinesterase which is particularly acute at high concentrations which are produced during the first few days after a collar has first been applied to the neck of the animal. In addition, local skin irritation has occasionally occurred at the site of the collar, especially when a new collar is first placed on the animal, notwithstanding the smooth surface of the collar. This is believed due to the fact that liberation of DDVP from presently available DDVP collars and tags is not at a uniform rate, but rather there is a high liberation rate of DDVP gas during the first few days after activation, i.e., removal of the collar from the packing and placing it on the neck of the animal. Moreover, the aforementioned initial high liberation rate represents an unduly rapid loss of insecticide and creates an upper limit on the period that DDVP is liberated at a rate sufficient to effectively control fleas.

It is an object of the present invention therefore to provide a substitute for DDVP in an animal collar for the control of fleas which does not have the objectionable characteristics found in the prior art collars.

A further object is to provide a novel method and article for treating animals for fleas which employs naled, either alone or in combination with a lesser amount of another insecticide such as DDVP.

The preparation of naled is described in U.S. Pat. No. 2,971,882 to Osmonson et al. PVC resin-naled combinations have been proposed for use as an insecticide of a general nature in French Pat. No. 1,568,198, issued Apr. 14, 1969, and in U.S. Pat. application Ser. No. 85,445, filed Jan. 30, 1961 (abandoned, but accessible to the public), and corresponding British Pat. No. 955,350. Netherlands published application No. 6,610,279 discloses fly strips composed of PVC-naled as well as PVC-DDVP combinations which are stated to have such high insecticide release rates as to require an outer laminate layer to retard the insecticide release. U.S. Pat. No. 3,344,021 discloses PVC-naled combinations for use as an anthelmintic composition.

A number of problems have been encountered in providing a commercially satisfactory PVC resin-naled combination as a pet collar. First, there must be a sufficient amount of naled released to provide effective control of fleas over periods of not less than 90 days. Contrary to statements in the prior art disclosures, I have found that release rates for naled are very much less than the release rates for DDVP. Naled has a low vapor pressure of about $2 \times 10^{-4}$ mm. Hg. at 20°C. as compared to that for DDVP of $1.2 \times 10^{-2}$ to be thus only about 1.7 percent of the vapor pressure of DDVP.

The concept of a vapor-emission controlled PVC-naled resin combination in the form of a collar to control fleas on dogs and cats requires significant emission rate to provide effective flea control. I have found it is not possible to increase the concentration of naled materially above about 25 percent without causing droplets of naled to form on the surface of the collar. Naled is toxic to animals and humans, and therefore concentrations of naled in excess of about 25 percent in a pet collar are not suitable.

A further unexpected problem found with a PVC-naled composition was the tendency of the resin to decompose during the shaping process. For example, unsatisfactory results were obtained in early tests where naled was substituted for DDVP in PVC combinations employed in extrusion apparatus used for making the prior art PVC-DDVP pet collar. Burning and charring of the extrudate were found to occur during curing of the collars, and the finished collar underwent an unexplainable reduction in the naled concentrations as compared with the naled concentration in the original plastisol dispersion.

Another object of the invention therefore is to provide a novel method of treating animals such as dogs or cats for fleas which involves making an insecticidal strip utilizing naled as the sole or principal insecticide where the collar has adequate tensile strength and other properties making the strip suitable in texture for use as a collar and yet being capable of releasing naled at a rate sufficient to control fleas over a period of time of at least 90 days.

A further object of the invention is to provide a method of treating animals by making a strip of synthetic resin containing between about 5 percent and 25 percent of naled through the use of a volatile additive which is released during the curing step to produce a texture including porous surface openings which allow for an unexpectedly large increase in the release of naled gas at a rate effective to control fleas to thus provide a collar which has an effective life of about 50 percent longer than the life of the prior art DDVP collars.

These and other objects of the invention will become more fully apparent from the claims, and from the description as it proceeds in connection with the appended drawings wherein:

Figure 1:
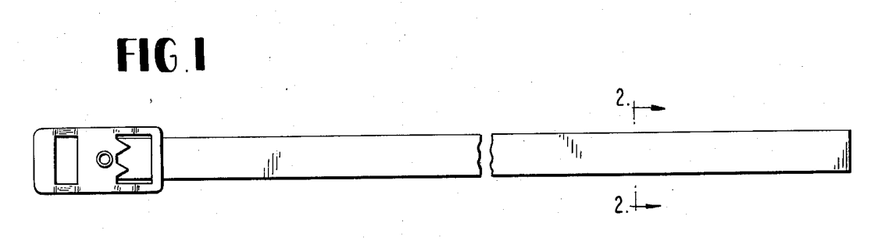
FIG. 1 is a plan view of a representative pet collar embodying the present invention.
Figure 2:
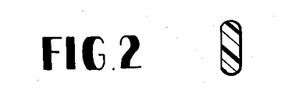
FIG. 2 is a view of the collar in cross section taken along lines 2—2 of FIG. 1.

Referring now to the drawings, FIGS. 1 and 2 show a typical collar adapted for pets such as dogs or cats. The components making up a satisfactory naled containing pet collar include a synthetic resin that is sufficiently pliable or flexible to be encircled around the animal's neck and has a strength sufficient to remain on the animal throughout a period of at least 4-½ months or the period during which naled is released in amounts effective to control fleas.

The collar constitutes a band or strip of a PVC-naled combination with the concentration of PVC sufficiently large to give the collar physical properties such as strength, flexibility, and freedom from tackiness to make it suitable for use as a collar for the animal. Normally, the cross-sectional dimensions of the collar vary from about one-fourth to five-eighth inch in width, and from about three thirty-seconds to three-sixteenths inch in thickness. For collars of the present invention employing the PVC-naled combination, the preferred dimensions are three-eighth in width and one-eighth inch in thickness, and the cross section is as illustrated in FIG. 2.

The collars are made of sufficient length to encircle the neck of the largest dog or cat to be encountered, and for smaller animals, the end of the collar may be cut off to reduce the size of the collar to correspond with the size of the animal. With the PVC-naled combination and dimensions as given above, the perimeter of the collar is about one inch and the mass of the collar is about one gram per lineal inch. By use of a clasp having a friction grip, the collar can be adjustably placed on the animal without the need for holes.

From the standpoint of toxicity, collars for dogs should be constructed so as to release no more than about two milligrams of naled per square inch of surface area per day. Because of increased toxicity and their generally smaller size, the release rate from collars for cats should be approximately one-half of that for dogs. It has been ascertained that when the release rate falls off to about 0.1 to about 0.2 milligrams of naled per square inch of surface area per day, that the effectiveness of the collar for flea control has been reduced to the point where it should be replaced. Because cats are smaller and have a tendency to sleep in a curled-up position, a lower naled release rate is effective for cat collars thereby allowing naled concentrations to be as low as 8 percent or as low as 5 percent when used in combination with another insecticide.

Naled exists within the matrix of the resin of the collar as a separate entity to be gradually released upon migration to the surface where it is dispersed to the immediate environment of the collar. Most of the naled escapes as vapor. In order for the naled to escape, it moves outward through the interstices or pores of the resin to the porous surface openings. The internal porosity, texture and surface porosity of the resin must be suffiently coordinated to allow a sufficient release of naled from the resin to effectively control fleas for a period of at least 90 days, but insufficient to form as droplets on the collar or to be toxic to the host animal.

The rate of expulsion of liquid naled can be further controlled as will be discussed below. It is, however, imperative that for animal collars, the amount of naled be kept below the level where the naled is expelled so rapidly as to form as liquid droplets, otherwise known in the art as "spew" on the collar surface in view of its toxicity to animals and humans. While prior art descriptions of naled containing compositions suggest that up to 75 wt. percent of a synthetic resin-naled combination may be produced and used as an insecticidal strip, I have found that no more than about 25 wt. percent can be used without encountering "spew."

The various known synthetic resins which can be used for a naled containing pet collar include materials such as polyethylene, polypropylene, copolymers of ethylene and propylene, nylon, cellophane, polyacrylates, such as polymers and copolymers of methylacrylate, ethylacrylate, methylmethacrylate and ethylmethacrylate; polymers of vinyl compounds, such as polystyrene, polymerized divinylbenzene; polyvinyl halogenides, such as polyvinylchloride; polyvinylacetals, such as polyvinylbutyral; polyvinylidene compounds, such as polyvinylidenechloride; polyvinylacetate; ethylvinylacetate-vinylacetate copolymers; copolymers of vinylchloride and vinylacetate; polyurethanes, polyaldehydes; and thermoplastics.

Polyvinylchloride (PVC) homopolymers and copolymers with other polymers such as polyvinyl acetate (PVA) are preferred synthetic resin materials. Suitable PVC resins are commercially available and include, for example, PVC homopolymer dispersion resin Diamond PVC-7502$^{TM}$ and PVC homopolymer extender resin Diamond PVC-7-446$^{TM}$, both available from The Diamond Shamrock Co., and mixtures thereof. Other suitable, commercially available PVC resins are known in the art. Suitable PVC-PVA copolymers are also commercially available and include, for example, Geon 135 (Goodrich Corp.), PVC-74 (Diamond Alkali Co.) and XR-6338 (Exxon-Firestone). Other PVC-PVA copolymers are also known in the art.

The preparation of synthetic resin-naled combinations is achieved by conventional methods. Because of the great compatibility of naled in the resin dispersions, the compositions may be prepared merely by mechanical mixing of the pesticides with powdered resin. Fluid pastes, or plastisol dispersions, can be made which, as is known, can be molded, extruded, cast, or otherwise formed into the shape of a band or strip. Where the prepolymerized resin exists in liquid form, as in the case of such monomers as styrene or methyl methacrylate, the naled may be incorporated in the liquid before it is polymerized or cured. The term "dispersion" as used herein is intended to include mixtures of a solid with a liquid, a liquid with a liquid and a solid with a solid.

In the embodiments where polyvinyl resins are used, plasticizers and other additives commonly used for providing the flexibility, strength and surface characteristics desired for a pet collar are well known to those skilled in this art, and no further discussion is deemed necessary here. In addition, coloring and odor control agents may be employed in the collars of the present invention to enhance consumer acceptance.

Naled (dimethyl 1,2-dibromo-2,2-dichloroethyl phosphate) is added to the plastisol dispersion in an amount sufficient when the synthetic resin is cured to release naled at a rate capable of controlling fleas on an animal wearing the collar. Minimum effective release rates for a pet collar are, as stated above, at least 0.1 to 0.2 mg. per square inch per day. To give the collar a useful life of at least 90 days, initial concentrations of naled in the formulations of the present invention should be above about 8 wt. percent of the collar weight, or above about 5 wt. percent naled where another insecticide, such as 5 wt. percent of DDVP, is used. For dogs, initial concentrations should be above about 14 wt. percent of the collar. The upper limit of naled in a pet collar should be below that which is toxic to the host animal, and less than about 25 wt. percent of the collar weight to avoid spewing.

Because of the low vapor pressure of naled, which is believed responsible for a relatively low release rate, the naled release rate from PVC-naled collars is comparatively low and inadequate for a commercially acceptable pet collar. However, I have found that use of an additive in the dispersion can be very helpful in increasing the naled release rate. This makes possible effective flea control at lower initial naled concentrations and a collar having an increased effective life.

The additive, also referred to as a surface porosity control component, is present in the final plastisol dispersion or mix used in forming the collar, and hence must be non-reactive with the other components of the dispersion or mix. The main function of the additive is to provide a surface porosity which preferably includes pores extending part way into the body of the collar. The desired surface characteristics are obtained by the vaporization of the additive during the curing period. Hence the additive should comprise one or more compounds having a boiling point at or below the curing temperature of the resin.

Compounds which are suitable as the surface porosity control component in PVC resins which are cured at a temperature in the range of between about 300° to 375°F. include aldehydes and their lower alkyl acetals containing bromine or chlorine. The porosity control component may thus include one or more of the following which have approximate boiling point temperatures as set forth:

| Name | B.P.°F. |
|---|---|
| chloroacetaldehyde | 185 |
| dichloroacetaldehyde | 192 |
| chloral | 218 |
| bromoacetaldehyde | 176-221 |
| dibromoacetaldehyde | 288 |
| bromal | 346 |
| bromodichloroacetaldehyde | 258 |
| chlorodibromoacetaldehyde | 299 |
| bromochloroacetaldehyde | 233 |
| 2-bromopropanol | 229 |

The surface porosity control component is included in the synthetic resin-naled combination in an amount sufficient to produce surface porosity by its vaporization during curing of the dispersion whereby said cured strip releases naled gas at a rate effective to control fleas throughout a period of at least about 90 days without forming droplets on the strip. While the amount of the porosity control component to be used depends on the density of surface openings desired and somewhat on the particular procedure used for curing the resin, it is generally from about 0.8 to 4, preferably from about 1 to 3, wt. percent of the dispersion.

It has been observed in analyses of the emitted gas vapor from the collar that some of the additive remains in the cured collar and is emitted when the package is initially opened. In some instances, the rate of naled release during the first few days after the collar package is opened has been measured to be somewhat lower than the naled release during the second and succeeding weeks. The rate of weight loss of the collar due to gas emission is the greatest during the first days, thus confirming the emission of components from the collar other than naled. These observations are somewhat at variance with the prior art statements that indicate a faster insecticide release rate in the beginning. Chemical analyses indicate that with a PVC-naled combination formed according to the present invention, the average naled release rate per day increases over a period up to about three to ten days, and thereafter begins to decrease. The overall release rate during a period of 4-½ months decreases by perhaps 50 percent from its maximum depending upon ambient conditions surrounding the collar.

Figure 3:
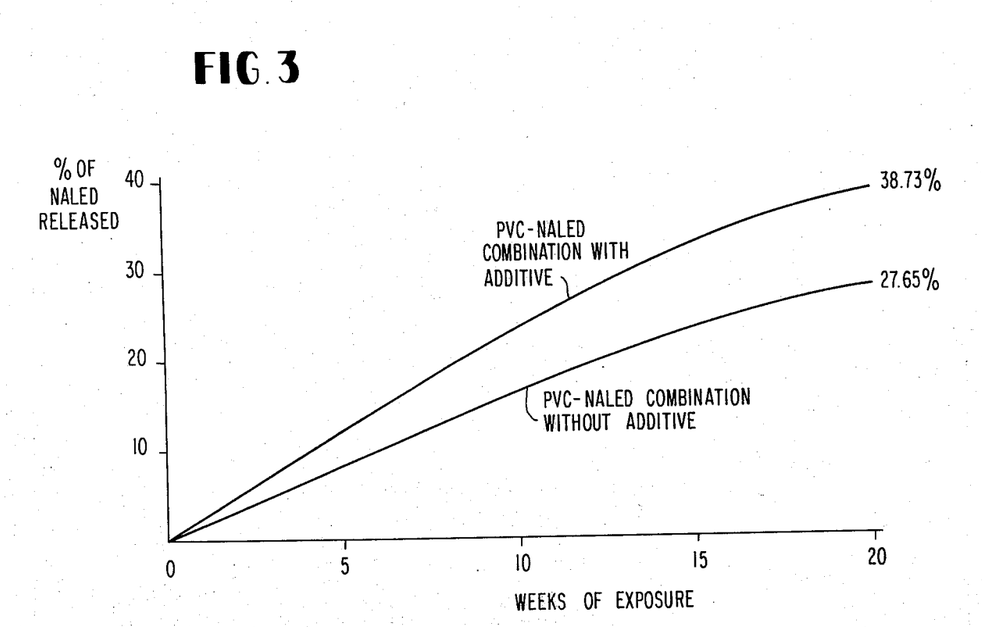
FIG. 3 is a graph showing the comparative rate of naled release in collars employing naled with a surface porosity control component or additive in accordance with the present invention and naled without the additive.

The extent to which the naled release is increased by use of the volatile additive in accordance with the present invention is demonstrated graphically by FIG. 3. At the end of 20 weeks, a dog collar made according to the Comparative Example below without the additive for controlling surface porosity released only 27.65 percent of the available naled in the collar, while a collar made according to the invention and having the surface porosity control additive released 38.73 percent which constitutes about a 40% increase in naled release. The residual amount of naled that will be retained in the collar is greater where the porosity control component or additive is not used. With the use of the porosity control additive, the naled concentration in the collar as manufactured can be sufficiently less than the amount which causes spewing to assure the proper physical condition of the collar when delivered to the consumer, and a greater proportion of the naled in the collar will be delivered during the useful life of the collar.

The treatment of warm blooded animals for fleas in accordance with the present invention involves placing on the neck of an animal a collar formed of a synthetic resin, and naled in an amount sufficient to kill fleas but insufficient to be toxic to the host animal.

The invention is additionally illustrated in connection with the following Examples which are to be considered as illustrative of the present invention. It should be understood, however, that the invention is not limited to the specific details of the Examples.

EXAMPLE 1

A mixture in percentages by weight of

| | |
|---|---|
| 37.7 | PVC homopolymer dispersion resin. Diamond PVC-7502™ |
| 16.2 | PVC homopolymer extender resin. Diamond PVC-7-44L™ |
| 17.8 | di-2-ethylhexylphthalate (DOP) |
| 2.4 | epoxidized octyl tallate (EPO) |
| 0.9 | calcium and zinc stearate powders (50—50 by wt.) |
| 22.7 | naled (dimethyl 1,2-dibromo-2,2-dichloroethyl phosphate) |
| 2.3 | surface porosity control component (e.g., bromodichloroacetaldehyde |
| 100.0 | Total | was thoroughly triturated to form a plastisol dispersion having a viscosity at 25°C. of 16,000 cps. as measured on a Brookfield viscometer at 20 rpm., 12,000 at 2 rpm. A portion of the plastisol was metered to a machined aluminum open-faced cast mold having a cavity ⅜ inch in width × 21 inches in length ⅛ inch in depth. Temperature of the mold at filling time, as indicated by a thermocouple immediately beneath the cavity surface was 290°F. The mold was placed in an oven and the temperature of the mold was raised by means of hot air and radiant heat in 2 minutes' time to 360°F. Temperature was maintained at 360°F. for 15 seconds to maintain the dispersion at or above the curing temperature, after which cooling was started, the temperature being lowered rapidly to 315°F. in 15 seconds. The buckle for the strip was placed in the mold while the dispersion was uncured. The cured strip with its buckle was immediately thereafter removed from the mold and cooled rapidly to room temperature. The color of the collar was brownish bronze. A strong medicinal odor emanating from the finished resin was detected. The top side of the collar was rounded due to the meniscus formed on filling the mold, the shape being retained during curing.

Analysis of the collar after curing and cooling showed the naled content of the collar to be 21 percent by weight. Other components calculated on a weight percentage basis in the product were 56.8 PVC, 18.8 DOP, 2.5 EPO, and 0.9 Ca, Zn stearate.

Diamond PVC 7502 is commercially available from The Diamond Shamrock Company and is a high molecular weight homopolymer dispersion resin having particle size less than two microns; specific viscosity is 1.62 to 1.68 as measured in a 1 percent solution of the resin in cyclohexane at 30°C. according to ASTM procedure.

Diamond PVC-7-44L is commercially available from Diamond Shamrock Chemical Company and is an intermediate molecular weight homopolymer extender resin having particle size such that 95 percent passes through 140 mesh with specific viscosity of 1.15 as measured in a 1 percent solution of the resin in cyclohexane at 30°C. according to ASTM procedure.

DOP is a plasticizer for PVC and EPO is a stabilizer. The calcium and zinc stearate powders are stabilizers.

The above dispersion and extender resins are as easy to work with in producing a satisfactory pet collar as any that have been used. However, as those skilled in this art well know, a large number of other materials, as discussed above, can be used. Naled is not known to react chemically with any synthetic resin, and considerable variations in both ingredients and proportions can be used successfully in forming a collar.

EXAMPLE 2

Following the procedures and utilizing the quantities of materials in Example 1, except that the heating time was reduced from two minutes to one minute and thirty seconds in the same oven during which time the mold temperature reached about 355°F., the collar produced was almost colorless. By chemical analysis, the naled content was 21.2 wt. percent. The same medicinal odor was present.

EXAMPLE 3

Following the procedure of Example 1 and using a plastisol dispersion consisting in parts by weight of:

| | |
|---|---|
| 40.8 | PVC homopolymer dispersion resin (Diamond-PVC-7502$^{TM}$) |
| 17.6 | PVC homopolymer extender resin (Diamond PVC-7-44L$^{TM}$) |
| 19.1 | di-2-ethylhexylphthalate (DOP) |
| 2.5 | epoxidized octyl tallate |
| 1.0 | calcium and zinc stearate powders (50—50 by weight) |
| 17.3 | naled (dimethyl 1,2-dibromo-2,2-dichloroethyl phosphate) |
| 1.7 | surface porosity control component (e.g., bromodichloroacetaldehyde) |
| 100.0 | Total | a bronze colored resin suitable as a dog collar was obtained which analyzed 16.0 percent of naled after curing and cooling. A medicinal odor was present.

EXAMPLE 4

Following the procedure of Example 1 and using a plastisol dispersion consisting in parts by weight of

| | |
|---|---|
| 43.8 | PVC homopolymer dispersion resin (Diamond PVC-7502$^{TM}$) |
| 18.8 | PVC homopolymer extender resin (Diamond PVC-7-44L$^{TM}$) |
| 20.6 | di-2-ethylhexylphthalate (DOP) |
| 2.8 | epoxized octyl tallate |
| 1.0 | calcium and zinc stearate powders (50—50 by weight) |
| 11.8 | naled (dimethyl 1,2-dibromo 2,2-dichloroethyl phosphate |
| 1.2 | surface porosity control component (e.g., bromodichloroacetaldehyde) |
| 100.0 | Total | a bronze colored resin suitable for a cat collar was obtained after curing and cooling which analyzed 11.05 weight percent naled after curing and cooling. A medicinal odor was present. Width of the collar was 0.3125 inch × thickness of 0.125 to 0.128 inch as from the cast mold. Average tensile strength as measured by the procedure of ASTM D-638 was 1690/240; 1690 psi. being required for breakage and 240 percent elongation occurring before breakage occurred. Hardness as measured by the Shore Durometer was A-2 = 82.5; D = 36.5. Specific gravity was 1.38.

EXAMPLE 5

Following the procedure of Example 1 and using a PVC plastisol dispersion containing 17.4 naled and a composition otherwise the same but proportionate, a synthetic resin analyzing 16.8 naled suitable as a dog collar was prepared. Width of the collar was 0.3750 inch and thickness was 0.132-0.148 inches as taken from the cast mold. The collar was bronze colored and had medicinal odor. Average tensile strength as measured by the procedure of ASTM D-638 was 1243/200; 1243 psi. being required for breakage and 20 percent elongation occurring before breakage occurred. Hardness as measured by the Shore A-2 Durometer was A-2 = 77; D = 32. Specific gravity of the resin was 1.39.

COMPARATIVE EXAMPLE

Following the procedure of Example 1 and using a plastisol dispersion consisting in parts by weight of

| | |
|---|---|
| 41.0 | PVC homopolymer dispersion resin. Diamond PVC-7502$^{TM}$ |
| 17.6 | PVC homopolymer extender resin. Diamond PVC-7-44L$^{TM}$ |
| 19.4 | di-2-ethylhexylphthalate |
| 2.6 | epoxidized octyl tallate |
| 1.0 | calcium and zinc stearate powders (50—50 by wt.) |
| 18.4 | naled (dimethyl 1,2-dibromo-2,2-dichloroethyl phosphate) |
| 100.0 | Total |

A resin containing 16.2 percent weight naled was in the finished collar indicating that 12 percent of the naled initially present in the dispersion was lost during the curing process. This is greater than the naled lost in the other Examples. The resin was slightly yellow and no odor could be detected. Width of the collar was 0.3750 inch and thickness was 0.108–0.113 inch. Average tensile strength as measured by the procedure of ASTM D-638 was 577/130; 577 psi. being required for breakage and 130 percent elongation occurring before breakage occurred. Hardness as measured by the Shore Durometer was A-2 = 73; D = 30. Specific gravity of the resin was 1.43.

| | |
|---|---|
| 37.0 | PVC-polyvinylacetate copolymer. Geon 135 |
| 18.5 | PVC homopolymer extender resin. Diamond PVC-7-44L |
| 20.0 | di-2-ethylhexylphthalate (DOP) |
| 3.5 | epoxidized octyl tallate (EPO) |
| 1.6 | calcium and zinc stearate powders (50—50 by wt.) |
| 0.6 | iron oxide |
| 17.6 | naled |
| 1.2 | surface porosity control component (bromo-dichloroacetaldehyde) |
| 100.0 | Total | is illustrative of a collar prepared by use of a copolymer rather than a homopolymer.

The procedures are essentially identical to the procedure described in connection with Example 1. The external appearance and physical properties are similar to those of Example 1 thereby providing a band which, when provided with a buckle such as illustrated in FIG. 1, is suitable for a pet collar.

EXAMPLE 7

The mixture of Example 1 is repeated except that 18 weight percent of a technical grade of naled (dimethyl 1,2-dibromo-2,2-dichloroethyl phosphate) commercially available from the Chevron Chemical Company is used. This product is known to contain certain impurities such as bromodichloroacetaldehyde, chloral, carbon tetrachloride and various forms of phosphates. These impurities constitute about 9 weight percent of the product and in large part are sufficiently volatile as to be released during the curing of the collar or shortly thereafter and hence not to interfere with the functioning of the collar.

The collar formed and cured in the manner indicated in Example 1 is brownish bronze and contains about 16.8 weight percent naled.

EXAMPLE 8

A dog collar is formed using a mixture (parts by weight) of

| | |
|---|---|
| 81.2 | methyl methacrylate monomer |
| 0.5 | benzoyl peroxide catalyst |
| 15.8 | naled (dimethyl 1,2-dibromo-2,2-dichloroethyl phosphate) |
| 2.5 | dibromoacetaldehyde (surface porosity control component) |
| 100.0 | Total |

The benzoyl peroxide, naled and dibromoacetaldehyde are mechanically mixed into the liquid methyl methacrylate monomer and the mixture is poured into the mold of Example 1 and cured at about 300°F. The buckle for the collar was placed in the mold while the dispersion was uncured. The cured strip was removed from the mold and cooled to room temperature. The collar had a clear color and contained (upon analysis) about 14 weight percent naled.

EXAMPLE 9

Example 8 is repeated using however liquid styrene monomer as the synthetic resin precursor. Benzoyl peroxide (0.5 weight percent) is used as a polymerization initiator and curing is performed at about 250°F. to yield a clear, transparent pet collar containing about 14 weight percent naled.

EXAMPLE 10

Example 8 is repeated using however polyurethane as the synthetic resin. A hydroxyl terminated liquid polybutadiene resin prepolymer (100 parts by weight) is blended with 8 parts by weight toluene diisocyanate, 18.5 parts by weight naled (dimethyl 1,2-dibromo-2,2-dichloroethyl phosphate), 0.02 parts by weight dibutyl tin laurate (curing catalyst) and 2 parts by weight 2-bromopropanol (surface porosity control component). The blended mixture is cured at a temperature of about 275°F. The resulting cured pet collar contains about 17 weight percent naled.

EXAMPLE 11

19.6 parts by weight of naled (dimethyl 1,2-dibromo-2,2-dichloroethyl phosphate) and 2 parts by weight of chloral are mixed into a melt of parts by weight of high density polyethylene maintained at 250°F. The melt is poured into the mold of Example 1 and rapidly cooled to form a transparent pet collar containing about 18 weight percent naled.

EXAMPLE 12

Example 11 is repeated using polypropylene and nylon as the synthetic resin and dichloroacetaldehyde as the surface porosity control component. Colars similar to that of Example 12 are produced.

Naled Release Rates

The release rate of naled from compositions utilizable in this invention for a given surface area of a collar of given thickness and surface area per unit length varies depending upon not only the initial naled concentration in the collar, but more importantly on whether or not the volatile additive which serves as a porosity control component has been used as discussed above and shown in FIG. 3. A collar formed according to the present invention containing an initial concentration of about 15 to 25 percent naled will release naled in sufficient amount for several months to control fleas on animals of large size such as dogs, and a similar collar containing initially about 8 to 15 percent naled will release naled at a sufficient rate to control fleas on animals of small size such as cats for a similar period.

One significant advantage of the naled collar of the present invention over the prior art DDVP collar in current commercial use is found in the pattern of release of insecticide as a gas during the first few days of activation which starts at the moment of removal from a sealed container. The initial release rate of naled during the first few days is only a fraction of the initial release rate of DDVP from comparable collars due mainly to the difference in vapor pressure. For naled with porosity control additive, the release rate does not decrease noticeably for a period of about 10 weeks; thereafter, the release rate gradually decreases to about 50 percent of the maximum at the end of about 20 weeks. The pattern of the release rate curve for naled from a PVC collar without the porosity control component is generally parallel.

Illustration of weight loss of dog collars (16.8% naled initial) over 20 weeks' time atmosphere exposure to laboratory air at room temperature of the collar prepared in Example 5 is given as follows:

| Exposure Time, cum days | % Weight Loss, cum. | Average Approx. Weight Loss mg. per day per inch² surface area (a) |
|---|---|---|
| 1 | — | Est. 2.0 |
| 4 | 0.42 | — |
| 7 | 0.59 | 0.5 |
| 14 | 1.03 | — |
| 21 | 1.25 | — |
| 28 | 1.53 | 0.4 |
| 35 | 1.77 | — |
| 42 | 1.99 | — |
| 49 | 2.21 | — |
| 56 | 2.40 | — |
| 63 | 2.57 | — |
| 70 | 2.83 | — |
| 77 | 2.95 | 0.2 |
| 84 | 3.11 | 0.2 |
| 91 | 3.27 | — |
| 98 | 3.36 | — |
| 105 | 3.51 | 0.2 |
| 112 | 3.69 | — |
| 119 | 3.80 | — |
| 126 | 3.78 | — |
| 133 | 3.94 | 0.2 |

-continued

| Exposure Time, cum days | % Weight Loss cum. | Av. Approx. Weight Loss mg per day per Inch² Surface Area (a) |
|---|---|---|
| 133 | 2.03 | 0.1 |

(a) Area = 1 inch² per lineal inch; weight 1g/lineal inch.

With reference to FIG. 3, the lower curve approximates the naled release rate for a collar prepared using the formulation of the Comparative Example, and the upper curve approximates the same release rates for a collar prepared using a formulation similar to Example 1. Comparison of release rates of naled from resins prepared without a volative additive that serves to provide the desired surface porosity with those prepared having such an additive shows that the naled release rate is substantially less with the former. This has been demonstrated by making the following comparison of naled loss as measured by analysis over a five month period of four collars taken at random from groups of collars, and is illustrated by FIG. 3. The end analysis shows that the percentage of naled liberated was 42 percent greater for collars made following the formulation using the porosity control component as compared with collars made following the formulation of the Comparative Example.

|  | Collars From Example 1 (Naled With Porosity Control Component) | Collars From Comparative Example (Naled Without Porosity Control Component) |
|---|---|---|
| Initial naled content in collar wt. % (a) | 16.8 | 16.2 |
| Naled content in collar 5 mo. after activation (a) | 10.3 | 11.8 |
| Naled released as a % of initial naled content | 38.6 | 27.1 |
| Increased naled release as a % of initial naled content due to surface porosity control component | 11.5 | |

(a) By analysis (a) Area = 1 inch² per lineal inch; weight 1g/lineal inch.

Further illustration of weight loss of cat collars over 20 weeks' time atmosphere exposure to laboratory air of the collar prepared in Example 4 (11.0 percent naled initial) is given as follows:

| Exposure Time, cum days | % Weight Loss cum. | Av. Approx. Weight Loss mg per day per Inch² Surface Area (a) |
|---|---|---|
| 1 | — | Est. 1.5 |
| 4 | 0.22 | — |
| 7 | 0.30 | 0.3 |
| 14 | 0.53 | 0.3 |
| 21 | 0.66 | — |
| 28 | 0.81 | — |
| 35 | 0.94 | 0.2 |
| 42 | 1.04 | — |
| 49 | 1.16 | — |
| 56 | 1.26 | — |
| 63 | 1.33 | 0.1 |
| 70 | 1.48 | — |
| 77 | 1.56 | — |
| 84 | 1.63 | 0.1 |
| 91 | 1.72 | — |
| 98 | 1.75 | — |
| 105 | 1.84 | 0.1 |
| 112 | 1.94 | 0.1 |
| 119 | 2.00 | 0.1 |
| 126 | 1.96 | 0.005 |

Insecticidal Efficacy of Naled Plastic Compositions

Insecticidal efficacy of naled plastic compositions in the form of animal pet collars was determined in either of two ways. In the first method, fleas were counted by inspecting the body regions of the animal and recorded on an animal profile chart over a period of 4 months. With this method it is sometimes difficult to obtain accurate counts due to movement of fleas and presence of dead fleas in the case of stick-tight fleas killed by insecticide. In the second method, flea egg counts are made by examining trays placed in the area beneath the animals. The following Table I demonstrates efficacy of the 15 percent PVC-naled collars made in accordance with Example 1 on dogs in the practice of the method of this invention as measured by flea count over a period of 112 days. Table II demonstrates insecticidal efficacy of 10 percent naled compositions on cats by the flea egg shed count method over a period of 120 days. Similar results are obtained using the collars of Examples 2 to 12.

Test 1

Effectiveness of naled plastic collars for controlling fleas on dogs was conducted in Northwest Mississippi from the end of September to mid-January. A pack of 29 Walker hounds were each individually collared with naled plastic collars of Example 1 and the dogs were kenneled in six pens each with its individual dog house. Flea counts were made before collaring and at 1, 2, 3 and 7 days, and 2, 3, 4, 5, 7, 10, 13, 14 and 16 weeks. At the start of the test, flea populations in the dog houses were enormous. Results are in Table I. Some of the dogs lost their collars during the test which is reflected count/dogs, the dogs being the number of dogs still having collars and remaining in the test count. There was no evidence of deleterious effects in appearance and behavior of the dogs so treated.

Table I

Effect of Naled Plastic Collars on Dogs
(Walker Hounds in Mississippi)

| Time | Total Flea Counts Per Total Dogs Retaining Collars | Average Fleas Per Dog |
| --- | --- | --- |
| Day 0 | 2543/39 | 65.2 |
| 1 | 741/39 | 19.0 |
| 2 | 390/39 | 10.0 |
| 3 | 256/39 | 6.6 |
| 7 | 335/38 | 8.8 |
| Week 2 | 314/36 | 8.7 |
| 3 | 335/33 | 13.5 |
| 4 | 234/32 | 7.3 |
| 5 | 143/33 | 4.3 |
| 7 | 273/31 | 8.8 |
| 10 | 63/28 | 2.3 |
| 12 | 99/25 | 4.0 |
| 13 | 114/25 | 4.6 |
| 14 | 55/25 | 2.2 |
| 16 | 92/20 | 4.6 |

Test 2

One group of twelve cats was arbitrarily selected and isolated from a total of twenty-two cats for treatment with PVC collars containing 10 percent naled and the remaining ten were used as control. All cats were observed for two weeks prior to the test in regard to flea egg shed, the group selected for treatment having a mean daily egg shed of 224 and the control group having a mean daily egg shed of 207. Both groups were infested with 100 fleas at weekly intervals during the entire test period one day prior to the test. PVC collars (10 percent naled) prepared as in Example 4 were taken from sealed packages, placed about the necks of the test cats and the following observations made on flea egg shed as indicated in Table II.

Table II

Flea Egg Counts From Cats Wearing
10% Naled Collars and Control Subjects

| Interval In Days | Mean Flea Egg Counts | | Percent[1] Reduction |
| --- | --- | --- | --- |
| | Naled Collars | Control | |
| Pretreatment | 224 | 207 | — |
| 0 | — | —. | — |
| 1 | 172 | 223 | 31 |
| 2–8 | 2 | 109 | 98 |
| 9–15 | 5 | 324 | 99 |
| 16–22 | 6 | 301 | 98 |
| 23–29 | 7 | 329 | 97 |
| 30–36 | 6 | 156 | 97 |
| 37–43 | 16 | 258 | 94 |
| 44–50 | 10 | 310 | 97 |
| 51–57 | 11 | 215 | 95 |
| 58–64 | 20 | 225 | 92 |
| 65–71 | 12 | 208 | 95 |
| 72–85 | 8 | 129 | 94 |
| 86–92 | 13 | 160 | 92 |
| 93–99 | 7 | 205 | 97 |
| 100–106 | 17 | 127 | 89 |
| 107–113 | 12 | 176 | 93 |
| 114–120 | 19 | 246 | 92 |
| 121 | Collars Removed | | |

Table II-continued

Flea Egg Counts From Cats Wearing
10% Naled Collars and Control Subjects

| Interval In Days | Mean Flea Egg Counts | | Percent[1] Reduction |
| --- | --- | --- | --- |
| | Naled Collars | Control | |
| 131 | 86 | 110 | 30 |

[1]Adjusted for control group variations by means of Abbott's formula. Abbott, W.S.J. Econ. Entom. 18, pp. 265–7. See also Statistical Methods in Biol. Assay, Finney, p. 564 (1925).

Cholinesterase Pharmacology Effects on Dogs

In order to assess the safety of naled-plastic compositions worn as collars by dogs, a study was conducted by Woodard Research Corporation (Chantilly, Virginia) using compositions containing 15 weight percent naled (See Example 1). Four groups of dix dogs in each group of various breeds were observed for 16 weeks. One group wore one flea collar, a second group wore two collars, a third group wore four collars, and a fourth group wore placebo collars (PVC with no naled). Dogs were evaluated in terms of weekly body weight, general physical condition, toxic signs, skin irritation of the neck region and appearance and behavior, all of which were normal. Hemograms consisting of hemoglobin and hematocrit determinations and total and differential leucocyte counts at 2, 4, 6, 8, 12 and 16 weeks were normal compared to initial values. Plasma cholinesterase and red blood cell (RBC) cholinesterase values showed no meaningful changes over the course of the study. No gross phathological signs were seen in any of the dogs at necropsy.

The absence of inhibition of plasma and RBC cholinesterase activity is considered significant compared to similar tests with collars containing about 10 percent DDVP wherein 43 percent inhibition of plasma cholinesterase was reported after installation of one anti-flea collar. Elsea, J. R. et al., The Journal of The American Veterinary Medical Association, No. 12, pages 2068–2074 (1970).

Physical Properties

Referring now to FIGS. 4 and 5, the photographs of FIG. 4 are of a naled-containing collar according to the invention and enlarged by 100 times. FIG. 4a is a view of the upper surface that does not contact a casting mold wall, whereas FIG. 4b is of the opposite side. Both Figures show extensive porous surface openings with the upper surface shown in FIG. 4a having a roughened texture with a high density of depressions that are connected to pores which facilitate transport of the naled from the interior of the collar to its surface.

Figure 5A:
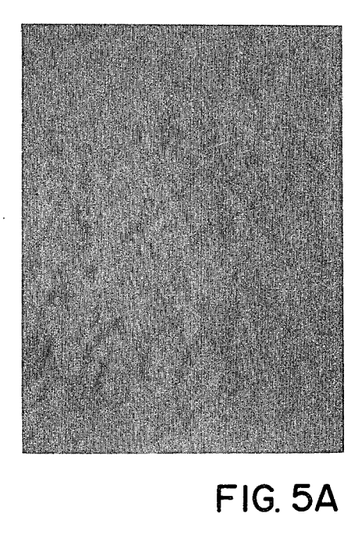
FIG. 5a is a view similar to view FIG. 4a of a collar containing naled but which was made without employing the surface porosity control component or additive of the present invention.
Figure 5B:
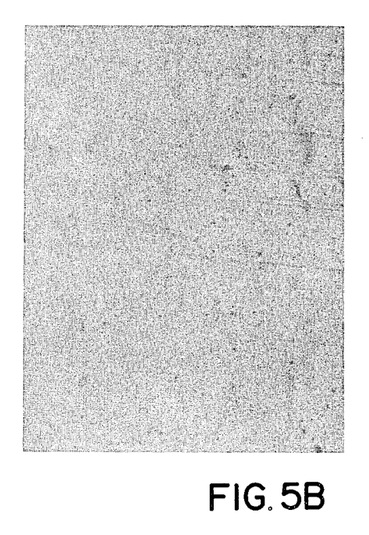
FIGS. 5b, 5c, and 5d are views of the collar of FIG. 5a that correspond to the views shown in FIGS. 4b, 4c, and 4d.

FIGS. 5a and 5b are similar views of a naled-containing collar which does not have in its dispersion the surface porosity control component as used for forming the collar shown in FIG. 4. In FIG. 5, the density of porous surface openings and the roughness of the upper surface shown in FIG. 5a are much less than for the collar shown in FIG. 4. It is the increase in the number and size of porous openings in the collar shown in FIG. 4 which clearly is responsible for the incremental increase in the naled release rate which is graphically represented by FIG. 3.

Figure 4A:
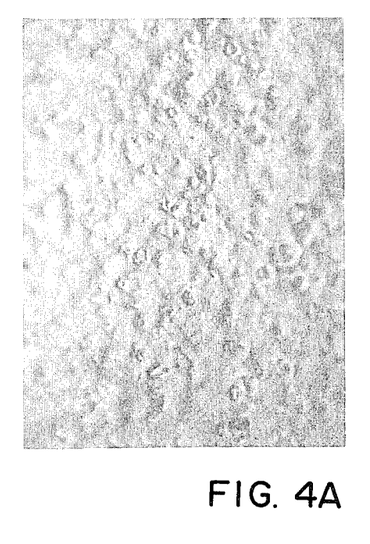
FIG. 4a is a photomicrograph enlarged by 100 times showing a section of the upper surface of a collar prepared in accordance with the invention.
Figure 4B:
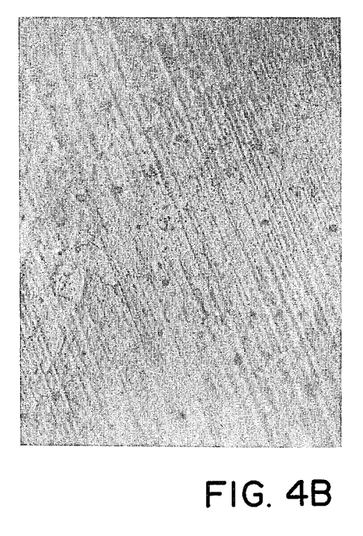
FIG. 4b is a similar view of the lower side of the collar that has been in contact with the casting mold.
Figure 4C:
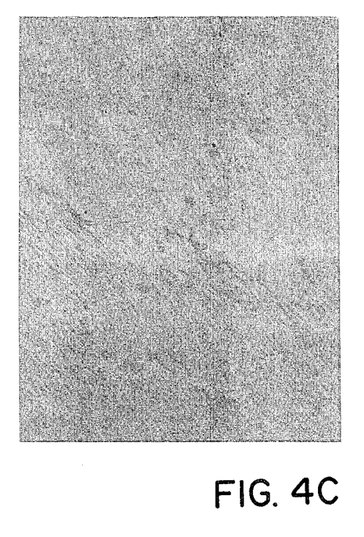
FIG. 4c is a similar view showing a side cut of the same collar.
Figure 4D:
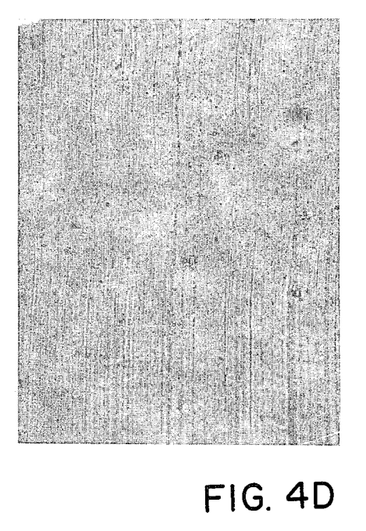
FIG. 4d is a similar view showing a longitudinal cross section of the same collar.
Figure 5C:
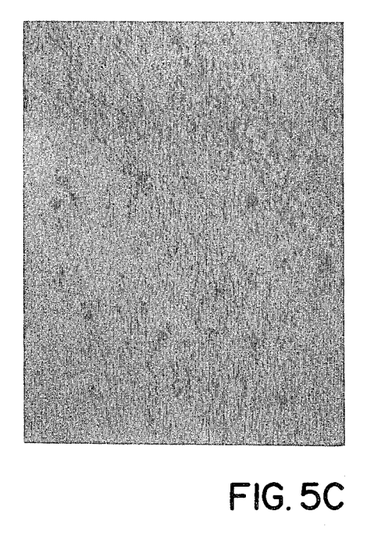
Figure 5D:
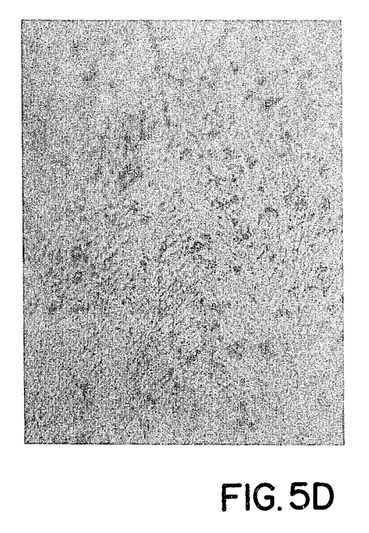

FIGS. 4c and 4d, when compared with FIGS. 5c and 5d, are evidence that further support the fact that the collar of FIG. 4 made from a dispersion containing the volatile surface porosity control component has a greater concentration of pores to facilitate the escape of the naled from the interior of the collar to the collar surface.

Summary of Advantages

The pet collar of the present invention not only has reduced toxicity as compared with the prior art DDVP collar, for the host animal, but also has an effective life which is about 50% or more longer than the life of the prior art DDVP collars.

Even though naled has been known and commercially available for a number of years prior to the present invention, and considerable research has been done with the use of naled as an insecticide, its substitution for DDVP as a pet collar has not been considered feasible. Efforts to shape a collar containing naled as the insecticide were unsuccessful in the initial research, so that actual testing of the effectiveness of naled for controlling fleas was made quite difficult. In addition, naled was not considered to be a likely condidate as a substitute for DDVP since its vapor pressure is known to be less than 2 percent of the vapor pressure of DDVP. Moreover, the problem of spewing with naled concentrations above about 25 percent set upper limits on the amount of naled that can be used in an article such as a collar which contacts the skin of a pet and comes into contact with children and others who may have physical contacts with the pet.

The collar of the present invention does not adversely inhibit the plasma and RBC cholinesterase activity of the animal as does DDVP. By including volatile additives in the plastisol dispersion used in forming the strip, it has been possible to increase the naled release rate to a level which allows for the mass production of a suitable flea collar for pets.

The collar in accordance with the present invention is produced to have a porous outer surface to not only release naled at a rate higher than otherwise possible and in a greater gross amount, but also to release naled at a rate effective to control fleas for a substantially longer period than otherwise possible.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. A flea control collar for a warm blooded animal comprising:
   a strip of flexible synthetic resin material containing between about 5 and 25 wt. percent naled and having a width, thickness and length sufficient to encircle the neck of the animal with clamping means at one end of the collars for engaging a spaced collar portion to prevent loss of the collar from the neck of the wearing animal; said strip being formed from a dispersion of a synthetic resin, naled and a surface porosity control component that is non-reactive in the dispersion and has a boiling point at or below the curing temperature of said resin, said dispersion being heated to its curing temperature to produce surface openings in communication with pores in said strip by vaporization of said porosity control component to provide for release of naled gas at a rate effective to control fleas on said animal throughout a period of at least about 90 days, but insufficient to form as droplets on the strip or to be toxic to said animal.

2. The flea collar of claim 1 wherein the synthetic resin is a polyvinyl chloride resin, the polyvinyl chloride resin is formed into said strip from a liquid plastisol dispersion including from about 0.8 to about 4 wt. percent of said surface porosity control component by filling an open faced casting mold pre-heated to a temperature of about 290°F., which is thereafter increased to about 360°F., and which is thereafter cooled and removed from said mold.

3. A method of treating a warm blooded animal for fleas which comprises:
   providing a strip having a width, thickness and length suitable for use as a collar for said animal, said strip comprising a mixture of a synthetic resin, and from between about 5 and 25 percent by weight of said strip of naled;
   said strip being formed from a dispersion of said synthetic resin, naled, and a minor amount of a surface porosity control agent that is nonreactive in the dispersion and has a boiling point at or below the curing temperature of said dispersion, which dispersion is formed into said strip at the curing temperature to vaporize said control agent and produce surface porosity in said strip to provide for release of naled at a rate to effectively control fleas on said animal throughout a period of at least about 90 days but insufficient to form as droplets on the strip or to be toxic to said animal;
   providing on said collar near one end a clamping means for engaging a spaced collar portion to prevent loss of the collar from the neck of the wearing animal; and
   placing and maintaining said collar on said animal.

4. The method of claim 3 wherein said synthetic resin is formed into said strip from a liquid plastisol dispersion containing polyvinyl chloride by filling an open faced casting mold pre-heated to a temperature of about 290°F., increasing the mold temperature to about 360°F. in a hot air, radiant heated oven for about two minutes, and thereafter cooling and removing the collar from said mold.

5. A flea control collar for a warm blooded animal comprising:
   a strip of a flexible synthetic resin material containing between about 5 and 25 wt. percent naled and having a width, thickness and length sufficient to encircle the neck of an animal with clamping means at one end of the collar to prevent loss of the collar from the neck of the wearing animal; said strip being formed from a liquid dispersion of a synthetic resin, naled and a surface porosity control component that is non-reactive in the dispersion and has a boiling point between about 176°F. and 375°F. to be at or below the curing temperature of the resin, said dispersion being heated to a curing temperature sufficiently high to produce surface openings in communication with pores produced by vaporization of said porosity control component to provide for the release of naled gas at a rate effective to control fleas on said animal throughout a period of at least about 90 days, but insufficient to form as droplets on the strip or to be toxic to the animal.

6. The collar of claim 5 wherein the surface porosity control component is present in a plastisol dispersion in an amount between about 0.8 and 4 wt. percent of the dispersion and is selected from the group consisting of chloroacetaldehyde, dichloroacetaldehyde, chloral, bromoacetaldehyde, dibromoacetaldehyde, bromal, bromodichloroacetaldehyde, chlorodibromoacetaldehyde, bromochloroacetaldehyde, 2-bromopropanol, or mixtures thereof.

7. The collar of claim 6 wherein the surface porosity control component is bromoacetaldehyde.

8. A method of treating warm blooded animals for fleas which comprises:

providing a dispersion of a synthetic resin, naled and between 0.8 and 4 wt. percent of a surface porosity control component that is non-reactive in the dispersion and has a boiling point between about 176°F. and 375°F. to be at or slightly below the curing temperature of the dispersion;

forming the dispersion into a strip having a width, thickness and length suitable for use as a collar for said animals including between 5 and 25 wt. % naled by heating said dispersion to its curing temperature to produce surface openings in communication with pores in said strip by vaporization of said surface porosity control component to provide for the release of naled gas at a rate effective to control fleas on said animal throughout a period of at least about ninety days but insufficient to form as droplets on the strip or to be toxic to said animals;

providing on said collar near one end a clamping means for engaging a spaced collar portion to prevent loss of the collar from the neck of the wearing animal; and placing and maintaining said collar on said animal.

9. The method of claim 8 wherein the surface porosity control component is selected from the group consisting of chloroacetaldehyde, dichloroacetaldehyde, chloral, bromoacetaldehyde, dibromoacetaldehyde, bromal, bromodichloroacetaldehyde, chlorodibromoacetaldehyde, bromochloroacetaldehyde, 2-bromopropanol, or mixtures thereof.

10. The method of claim 8 wherein the surface porosity control component is bromoacetaldehyde.

* * * * *